United States Patent
Cox et al.

(10) Patent No.: US 10,167,996 B2
(45) Date of Patent: Jan. 1, 2019

(54) ATTACHMENT BRACKET WITH ADJUSTMENT MECHANISMS AND PIVOT

(71) Applicant: Tesla, Inc., Palo Alto, CA (US)

(72) Inventors: Dylan Thomas Cox, Los Altos, CA (US); Dan Calder, Pleasanton, CA (US); Javor Gnjidic, Sunnyvale, CA (US)

(73) Assignee: Tesla, Inc., Palo Alto, CA (US)

( * ) Notice: Subject to any disclaimer, the term of this patent is extended or adjusted under 35 U.S.C. 154(b) by 135 days.

(21) Appl. No.: 15/435,360

(22) Filed: Feb. 17, 2017

(65) Prior Publication Data

US 2017/0234482 A1    Aug. 17, 2017

Related U.S. Application Data

(60) Provisional application No. 62/296,555, filed on Feb. 17, 2016.

(51) Int. Cl.
| | | |
|---|---|---|
| *A47F 5/00* | (2006.01) | |
| *F16M 13/02* | (2006.01) | |
| *F16H 25/20* | (2006.01) | |
| *F16M 11/04* | (2006.01) | |
| *F16M 11/12* | (2006.01) | |
| *F16M 11/18* | (2006.01) | |

(52) U.S. Cl.
CPC ............. *F16M 13/02* (2013.01); *F16H 25/20* (2013.01); *F16M 11/043* (2013.01); *F16M 11/12* (2013.01); *F16M 11/18* (2013.01); *F16H 2025/2062* (2013.01); *F16M 2200/024* (2013.01)

(58) Field of Classification Search
USPC ......... 248/674, 200, 637, 554, 309.1, 288.11
See application file for complete search history.

(56) References Cited

U.S. PATENT DOCUMENTS

| | | | | |
|---|---|---|---|---|
| 4,097,012 A | * | 6/1978 | McIntyre | ............ B60R 11/0205 224/540 |
| 7,243,885 B2 | * | 7/2007 | Zeiher | ................... B60R 19/483 248/188.2 |
| 8,144,476 B2 | * | 3/2012 | Hirose | ................... H05K 5/006 361/730 |

(Continued)

*Primary Examiner* — Monica E Millner
(74) *Attorney, Agent, or Firm* — Bruce E. Garlick; Garlick & Markison

(57) ABSTRACT

An adjustable bracket includes a body of quadrilateral shape that defines an attachment plane for a device, which includes a first adjustment mechanism located adjacent a first corner of the quadrilateral shape, a second adjustment mechanism located adjacent a second corner of the quadrilateral shape, and a pivot. The first adjustment mechanism includes a first passage transverse to the attachment plane, a second passage parallel to the attachment plane and leading to the first passage, and a first moveable member extending in the first passage. The second adjustment mechanism includes a third passage transverse to the attachment plane and a fourth passage parallel to the attachment plane, and a second moveable member extending into the third passage. The pivot locates adjacent a fourth corner of the quadrilateral shape such that the first and second adjustment mechanisms are configured for adjusting the adjustable bracket relative to the pivot.

22 Claims, 8 Drawing Sheets

(56) References Cited

U.S. PATENT DOCUMENTS

| | | | | |
|---|---|---|---|---|
| 8,627,564 B2* | 1/2014 | Blossfeld | ............... | H01R 43/18 |
| | | | | 29/883 |
| 9,279,437 B2* | 3/2016 | Gold | ..................... | G01S 7/4004 |
| 9,346,414 B1* | 5/2016 | Kuhens | ............... | B60R 11/0258 |
| 9,914,419 B2* | 3/2018 | Fath | .......................... | B60R 9/06 |
| 2012/0320596 A1* | 12/2012 | Hastings | .............. | F16M 11/121 |
| | | | | 362/259 |
| 2015/0069193 A1* | 3/2015 | Meinel | ................. | H01Q 1/3233 |
| | | | | 248/188.4 |
| 2015/0250072 A1* | 9/2015 | Ichikawa | ............... | H05K 5/063 |
| | | | | 439/587 |
| 2017/0324155 A1* | 11/2017 | Styles | ................. | F16M 11/125 |

* cited by examiner

ATTACHMENT BRACKET WITH ADJUSTMENT MECHANISMS AND PIVOT

CROSS REFERENCE TO RELATED APPLICATIONS

The present U.S. Utility patent application claims priority pursuant to 35 U.S.C. § 119(e) to U.S. Provisional Application No. 62/296,555, entitled "ATTACHMENT BRACKET WITH ADJUSTMENT MECHANISMS AND PIVOT," filed Feb. 17, 2016 which is hereby incorporated herein by reference in its entirety and made part of the present U.S. Utility patent application for all purposes.

BACKGROUND

There are many contexts where it is desirable to make a device or other component adjustable. One such area is in vehicles, where the assembly of many components into the finished structure can lead to certain variations in particular dimensions, within the specified range of acceptable values. Devices used for emission or detection are sometimes dependent on being oriented in a particular horizontal or vertical direction relative to the rest of the vehicle. For example, a radar or other sensor should be mounted on the vehicle such that its horizontal and vertical orientation are within specified limits. This adjustment can be performed during the manufacturing stage to ensure that the new vehicle has a functioning radar/detector. Moreover, if the device itself later moves out of proper alignment (such as due to external force) it may become necessary to readjust the device back to the intended position. Existing approaches for attachment can be complex, costly to manufacture, or difficult to adjust after installation.

DETAILED DESCRIPTION

Figure 1:
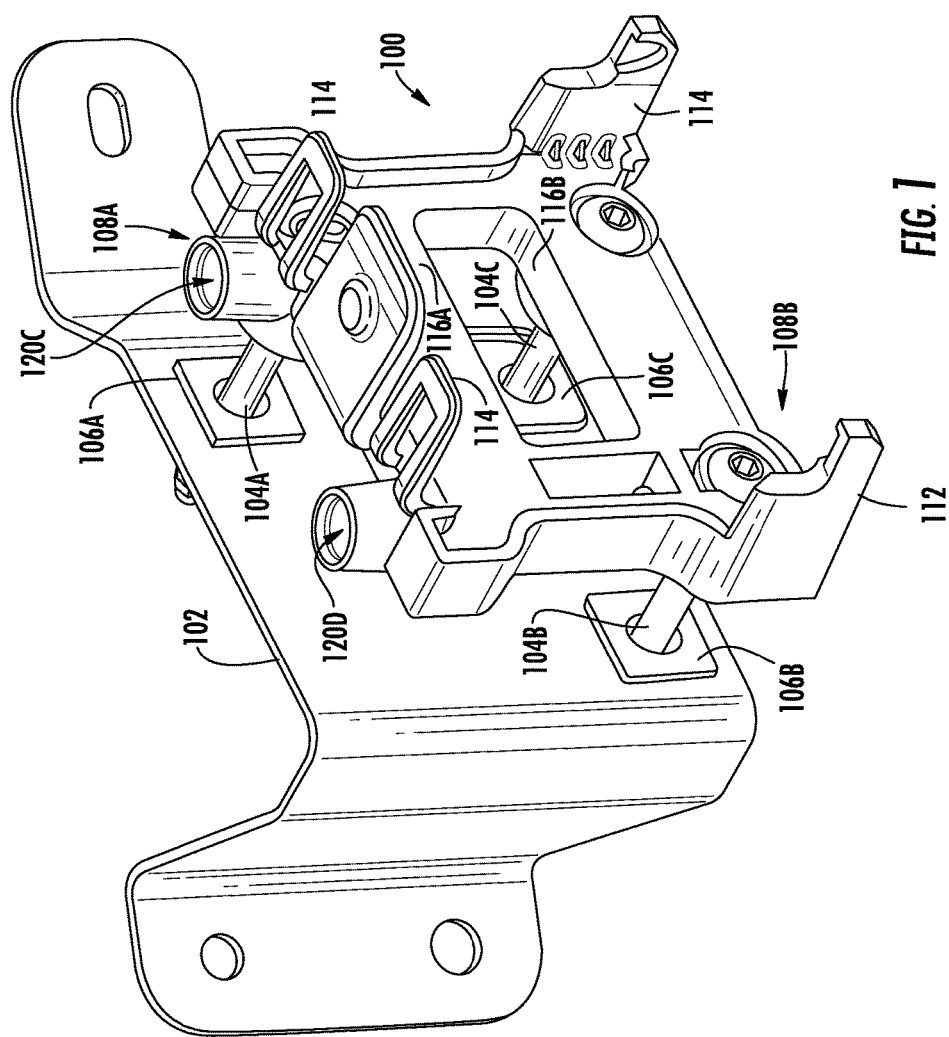
FIG. 1 shows a perspective view of an example of an adjustable bracket according to one or more embodiments.

This document describes examples of systems and techniques for providing an adjustable bracket that can be used for holding one or more devices, thereby making the positioning of the device, and any later readjustment thereof, reliable and convenient. In some implementations, vertical and horizontal adjustment mechanisms are accessible on the same side of the device and are operated in exactly the same manner and using the same tool. This can make it easy to adjust the device in either or both directions, particularly when the operator is also reading the output from some other device or system in order to determine when the proper adjustment has been made. For example, with vehicle-mounted radars a calibration procedure is sometimes used that involves placing a reflective object in front of the operating radar and monitoring the reflected signals. The operator can then adjust the device, using the adjustment mechanisms on the bracket and according to feedback from the testing equipment, until the proper alignment is accomplished.

Some examples herein mention a radar as being adjustable using the described brackets. This is done for illustrative purposes only. In some implementations, a device other than a radar can be adjusted using such bracket(s). For example, adjustment can be done of another device that performs directional emission and/or detection.

In a first aspect, an adjustable bracket includes a body of quadrilateral shape that defines an attachment plane for a device, which includes a first adjustment mechanism located adjacent a first corner of the quadrilateral shape, a second adjustment mechanism located adjacent a second corner of the quadrilateral shape, and a pivot. The first adjustment mechanism includes a first passage transverse to the attachment plane, a second passage parallel to the attachment plane and leading to the first passage, and a first moveable member extending in the first passage. The second adjustment mechanism includes a third passage transverse to the attachment plane and a fourth passage parallel to the attachment plane and leading from a third corner of the quadrilateral shape to the third passage, and a second moveable member extending into the third passage. The pivot locates adjacent a fourth corner of the quadrilateral shape such that the first and second adjustment mechanisms are configured for adjusting the adjustable bracket relative to the pivot.

Implementations may include any or all of the following features. The second passage and the fourth passage may be parallel to each other. The adjustable bracket is configured to be installed so that openings of the parallel second and fourth passages face upward. The first passage and the third passage may each extend through an entire thickness of the body. The first and second moveable members may include respective first and second threaded posts each configured to engage in a threaded fit with a respective one of first and second fasteners, wherein rotation of the first or second threaded post relative to the respective first or second fastener causes adjustment of the adjustable bracket. The first and second fasteners may include respective first and second grommets. The pivot may include a third threaded post configured to engage in a threaded fit with a third grommet. The third grommet may provide pivoting ability to the adjustable bracket. The first threaded post may have first teeth adjacent the second passage, the second threaded post may have second teeth adjacent the fourth passage, and the first and second teeth may be configured for rotational advancement and retraction of the first and second threaded posts, respectively. Each of the first and second threaded posts may include a bolt, a toothed washer adjacent a head of the bolt, and a weld securing the toothed washer to the bolt.

The first passage may be at least partly defined by a first partially open cylinder, the first partially open cylinder having a first opening facing the second passage, and wherein the third passage may be at least partly defined by a second partially open cylinder, the second partially open cylinder having a second opening facing the fourth passage. The first teeth may be oriented parallel to the first threaded post and/or positioned around an outside of the first partially open cylinder, and wherein the second teeth are oriented parallel to the second threaded post and are positioned around an outside of the second partially open cylinder. A pitch of the first and second threaded posts may be selected to provide a particular adjustment resolution of the adjustable bracket. The adjustable bracket may include first and second transverse members that are parallel and connected to each other at respective ends to form the attachment plane. The first and second passages may be located in the first transverse member, wherein the third passage is located in the second transverse member, and wherein the fourth passage may extend between the first and second transverse members.

The first adjustment mechanism may be configured for adjusting the adjustable bracket in a first direction, and the second adjustment mechanism may be configured for adjusting the adjustable bracket in a second direction transverse to the first direction. The first adjustment mechanism may be configured for vertical adjustment, and the second adjustment mechanism may be configured for horizontal adjustment.

In a second aspect of the disclosure, a kit may include an adjustable bracket, a first adjustment mechanism, a second adjustment mechanism, and a pivot. These components may be same/similar as those described above. Implementations may include a number of features, including the adjustable bracket being of quadrilateral shape and defining the attachment plane. In such case, the first adjustment mechanism may be located adjacent a first corner of the quadrilateral shape and the second adjustment mechanism located adjacent a second corner of the quadrilateral shape. The adjustable bracket may include first and second transverse members that are parallel and connected to each other at respective ends to form the attachment plane. The first transverse passage may be in the first transverse member and the third transverse passage may extend between the first and second transverse members. The toothed actuator may include a screwdriver on which a part of the tip has been removed to facilitate meshing between the third teeth and the respective first and second teeth.

Figure 2:
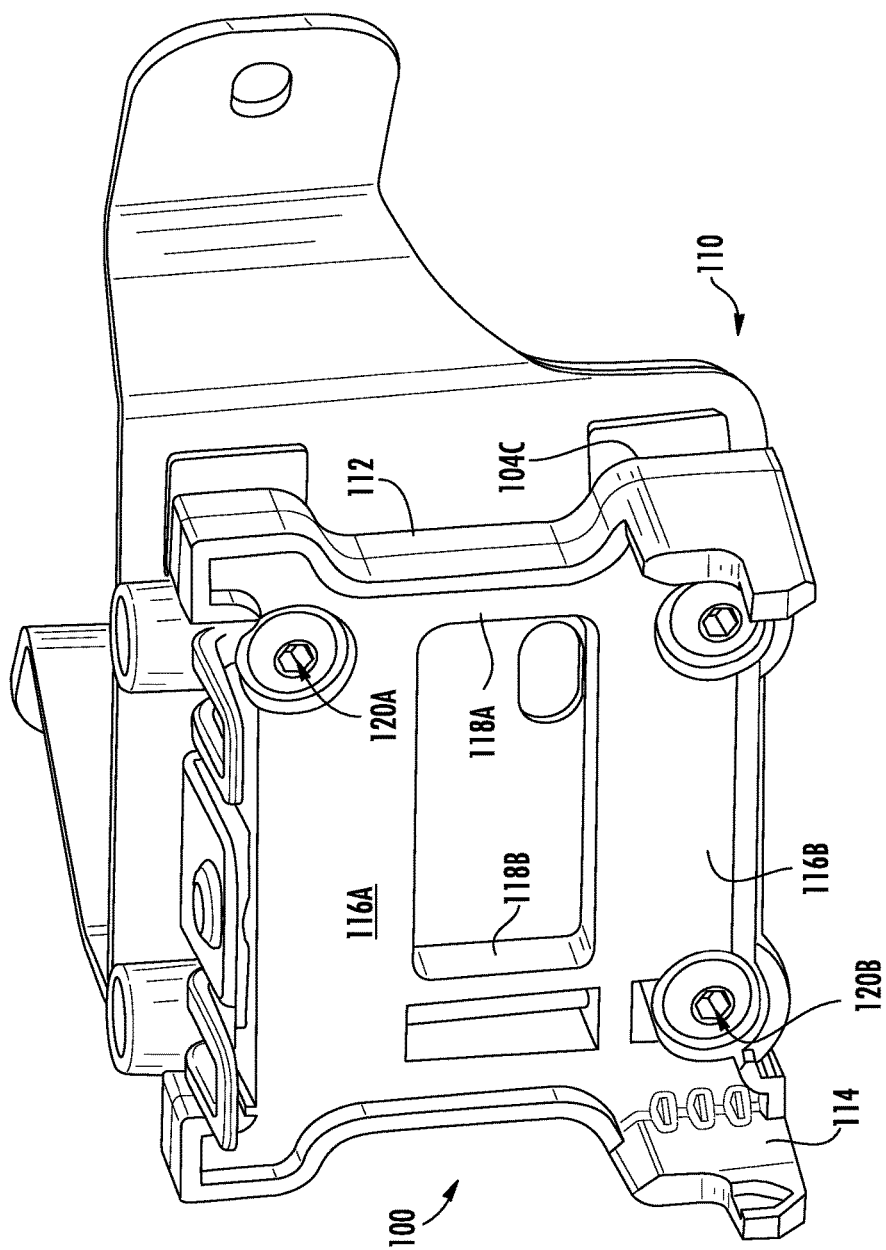
FIG. 2 shows another perspective view of the adjustable bracket of FIG. 1.

FIG. 1 shows a perspective view of an example of an adjustable bracket 100 according to one or more embodiments. FIG. 2 shows another perspective view of the adjustable bracket 100 of FIG. 1. The adjustable bracket 100 can be mounted on an element 102 by moveable members that permit selective adjustment and readjustment. Here, posts 104A-C connect these two components to each other. The element 102, in turn, can serve as an adapter so that the adjustable bracket can be used in a particular environment. For example, the element 102 is tailored for structure in one vehicle model and a different element can be used in a different vehicle model, or with another system or structure.

The posts 104A-C here provide the connection between the adjustable bracket 100 and the element 102. In some implementations, the posts are secured to the adjustable bracket 100 so that they are free to rotate relative to that component. The other end of the posts 104A-C, on the other hand, can engage with the element 102 by way of one or more fasteners. For example, and without limitation, the element 102 can have openings provided with respective grommets 106A-C. Rotation of a post, one of posts 104A-C, can advance or retract that particular post relative to the element 102.

The adjustable bracket 100 can have adjustment mechanisms. Here, mechanisms 108A-B include the posts 104A-B, respectively, among other aspects, and serve to manipulate these posts for purposes of adjustment. The adjustment mechanism 108A can be configured for adjusting the adjustable bracket in one direction, and the adjustment mechanism 108B can be configured for adjusting the adjustable bracket in another direction transverse to the first one. For example, the adjustment mechanism 108A can be configured for vertical adjustment of the bracket, and the adjustment mechanism 108B can be configured for horizontal adjustment of the bracket.

That is, the posts 104A-B in the respective adjustment mechanisms 108A-B are examples of moveable members that are configured to engage in a threaded fit with a respective one of first and second fasteners, such as the grommets 106A-B. In particular, rotation of such threaded post relative to its respective fastener can effectuate adjustment of the adjustable bracket.

The adjustable bracket 100 can pivot about one or more pivots to allow for adjustment in respective direction(s). Here, a pivot 110 is provided. In some implementations, the pivot 110 comprises the post 104C. The post 104C can be configured to engage in a threaded fit with a fastener, such as a grommet. For example, the grommet can provide pivoting ability to the adjustable bracket 100.

The adjustable bracket 100 includes a body 112. The body 112 can be made of any suitable material, including, but not limited to, metal or a plastic material. For example, the body 112 can be made via molding, such as using an injection molding process. The body 112 can be provided with one or more attachments. Here, attachments 114 are shown for illustrative purposes. For example, the attachments 114 can be tailored to the shape of a particular device, or to the form factor of a category of devices. The attachments 114 can be integral to the body (e.g., made in a molding process). The body and/or the attachments 114 define the place where the device can be secured to the body 112. In some implementations, an attachment plane is defined. For example, the plane can be substantially perpendicular to the direction of the posts 104A-C.

The body 112 includes transverse members 116A-B. Here, transverse member 116A is the upper one and the transverse member 116B is the lower one, but the members can be oriented in any direction. In some implementations, the transverse members 116A and 116B are parallel to each other. For example, an element 118A can connect certain parts (e.g., the ends) of the transverse members 116A and 116B to each other, and another element 118B can connect other parts of the members to each other.

The body 112 can have multiple passages that facilitate the adjustment. For example, the passages can provide access for an adjustment tool, or for a movable member. Here, a passage 120A is used to accommodate the post 104A, and a passage 120B is used to accommodate the post 104B. A passage 120C in the body 112 can lead to the passage 120A. Also, a passage 120D in the body 112 can lead to the passage 120B. Here, for example, the passages 120A and 120C are located in the transverse member 116A. Also, here the passage 120B is located in the transverse member 116B. Finally, in this example the passage 120D extends between the transverse members 116A-B and leads to the passage 120B. As such, the passages 120C and 120D are here parallel to each other. In some implementations, the body 112 is installed (e.g., together with the element 102) so that the passages 120C and 120D are oriented in a direction that is convenient for a person adjusting the body 112. For example, this can be an upward direction. Other locations of passages are included with differing embodiments.

The passages 120A and 120B that accommodate respective posts, can extend partially or entirely through the thickness of the body 112. In this implementation, these passages 120A and 120B allow the post (e.g., a threaded bolt) to be inserted from one side of the body 112 until the head abuts the body 112, such that the body of the post extends on the other side. In other implementations, either or both of the passages 120A and 120B can extend partly through the body 112 of the adjustable bracket 100.

In short, the above describes examples relating to the adjustable bracket 100 having the body 112 that is of quadrilateral shape, wherein the bracket defines an attachment plane for one or more devices (not shown). Moreover, the examples show that the adjustment mechanism 108A is positioned adjacent a corner of the bracket, and that the adjustment mechanism 108A includes the passages 120A and 120C and the post 104A. Also, the examples show that the adjustment mechanism 108B is positioned adjacent another corner of the bracket, and that the adjustment mechanism 108B includes the passages 120B and 120D and the post 104B. Finally, the examples show that the pivot 110 is located adjacent yet another corner of the bracket, and that the pivot includes the post 104C which here extends through another passage of the body of the bracket. Each of the adjustment mechanisms 108A-B is configured for adjusting the adjustable bracket relative to the pivot.

Figure 3:
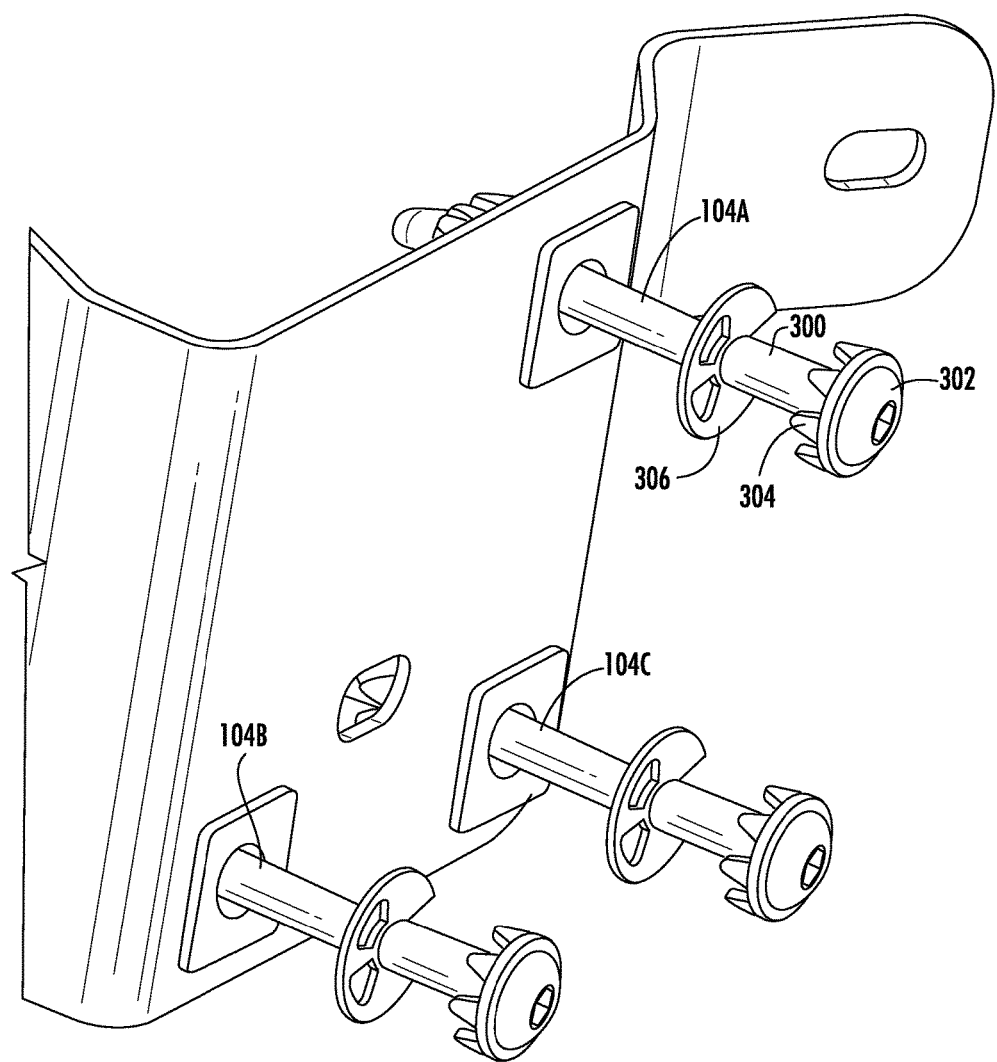
FIG. 3 shows an example of moveable members that can be used for an adjustable bracket.

FIG. 3 shows an example of moveable members that can be used for an adjustable bracket 110. Here, the body 112 has been removed for clarity. In some implementations, the posts 104A-C can be used as the moveable members. For example, some or all of the posts 104A-C can be threaded. Here, each post 104A-C has a body 300, a head 302 on the body, a set of teeth 304 oriented around the head, and a snap ring 306 positioned along the body 112. For example, the head and the snap ring 306 can interact to allow the post to rotate with regard to the body of the bracket. 100

With reference again briefly to FIGS. 1-2, the post 104A can be positioned so that the teeth 304 thereof are adjacent the passage 120C. The post 104B, moreover, can be positioned so that the teeth 304 thereof are adjacent the passage 120D. For example, these teeth 340 can be configured for rotational advancement and retraction of the posts 104A-B, respectively.

Figure 4:
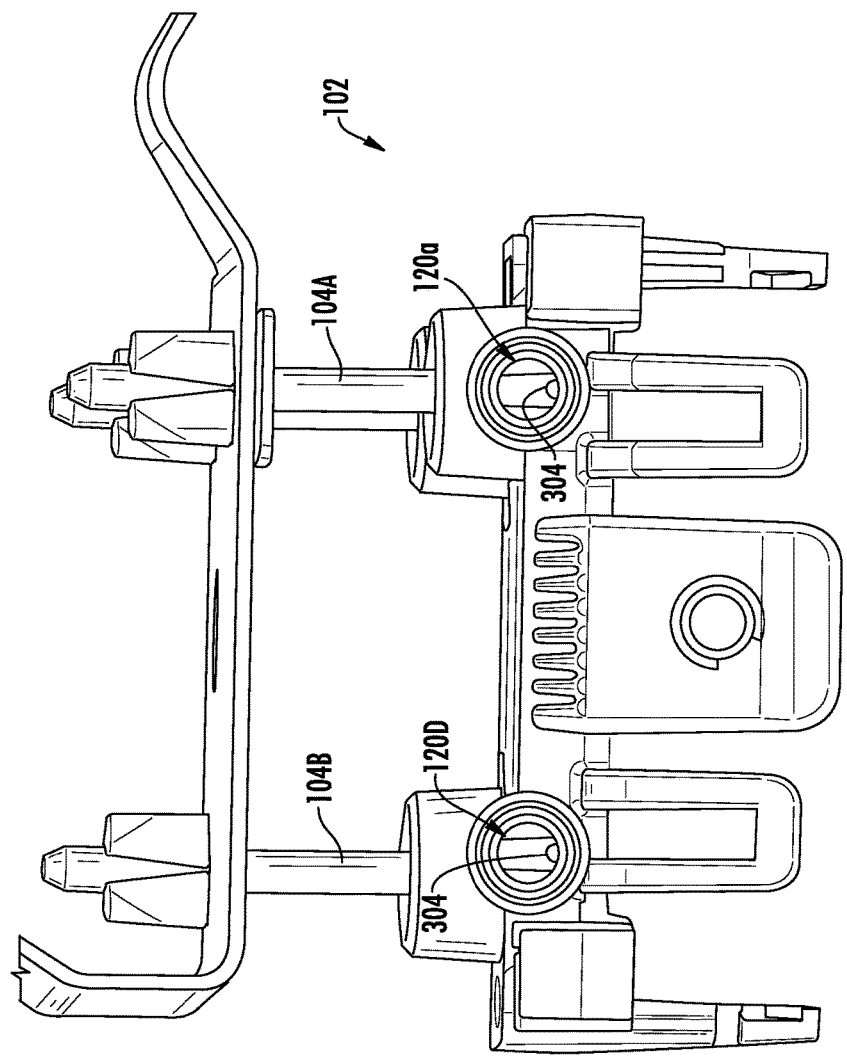
FIG. 4 shows another perspective view of the adjustable bracket of FIG. 1.

FIG. 4 shows another perspective view of the adjustable bracket 100 of FIG. 1. The post 104A is here visible also through the opening of the passage 120A; the post 104B, moreover, is visible also through the opening of the passage 120D. In particular, this example illustrates that the respective teeth 304 of the posts 104A-B can be at least partially exposed by way of the passages 120C and 120D. This can allow access by an actuator tool for purposes of adjusting either of the adjustment mechanisms of the adjustable bracket 100.

Figure 5:
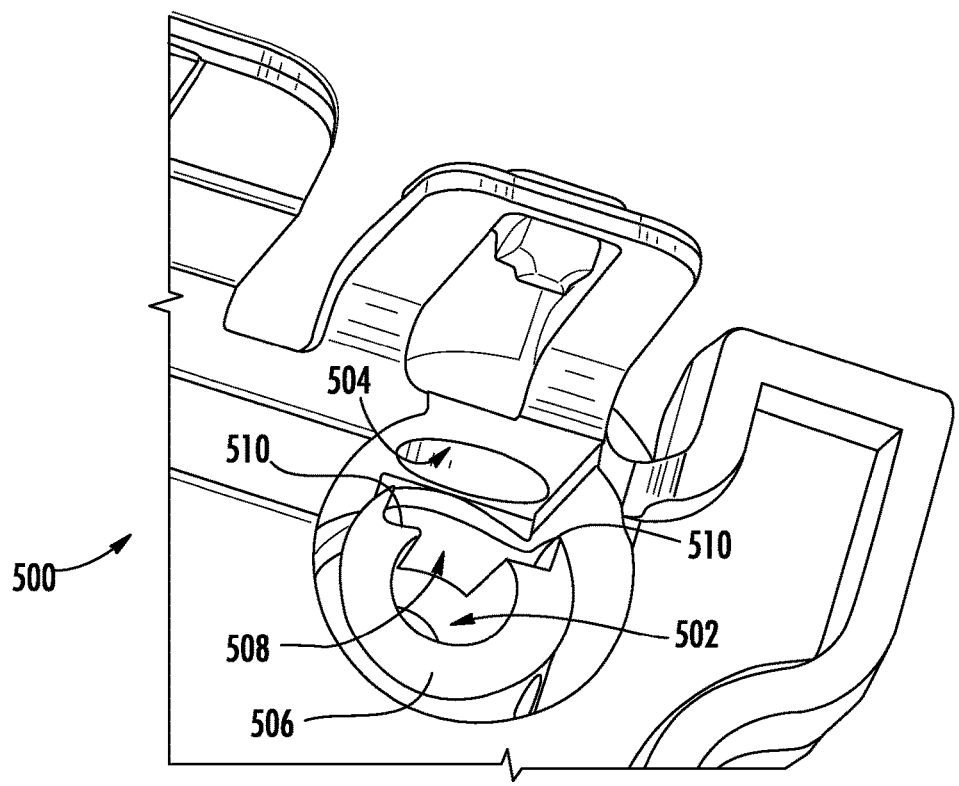
FIG. 5 shows an example of an adjustment mechanism.

FIG. 5 shows an example of an adjustment mechanism 500. The adjustment mechanism 500 can be used with any or all implementations described herein, for example in the adjustment mechanism 108A (FIG. 1). Some elements of FIG. 1 will be mentioned, without limitation, to illustrate the adjustment mechanism.

Here, the adjustment mechanism 500 includes a passage 502 that is transverse to the attachment plane defined by the bracket in this example. Another passage 504, moreover, is parallel with that plane and leads to the passage 502. The passage 502 is here at least partly defined by a partially open cylinder 506. In some implementations, the open cylinder 506 is partially open because it has an opening 508 that faces the passage 504. For example, the opening can be shaped so that a plane 510 is formed towards the passage 504.

With reference, again also to FIG. 3, the particular moveable member (e.g., the post 104A) can be configured so that the teeth 304 thereof are oriented parallel to the body of that post. Moreover, the post and the adjustment mechanism can be configured so that the teeth are positioned around an outside of the partially open cylinder 506, while the body of the post extends through the passage 502. This can allow an actuator tool to be inserted through the passage 504 to a point at or near the post. For example, the tool can bear onto the body of the post, or the plane 510, or both. This position can allow the tool to engage the teeth of the post so as to rotate the post in either direction. For example, by rotating the actuator the teeth can be advanced in either direction, thereby causing the post to be rotated. This can allow the movable member to be advanced or retracted relative to some point of engagement, such as a grommet or other fastener.

Figure 6:
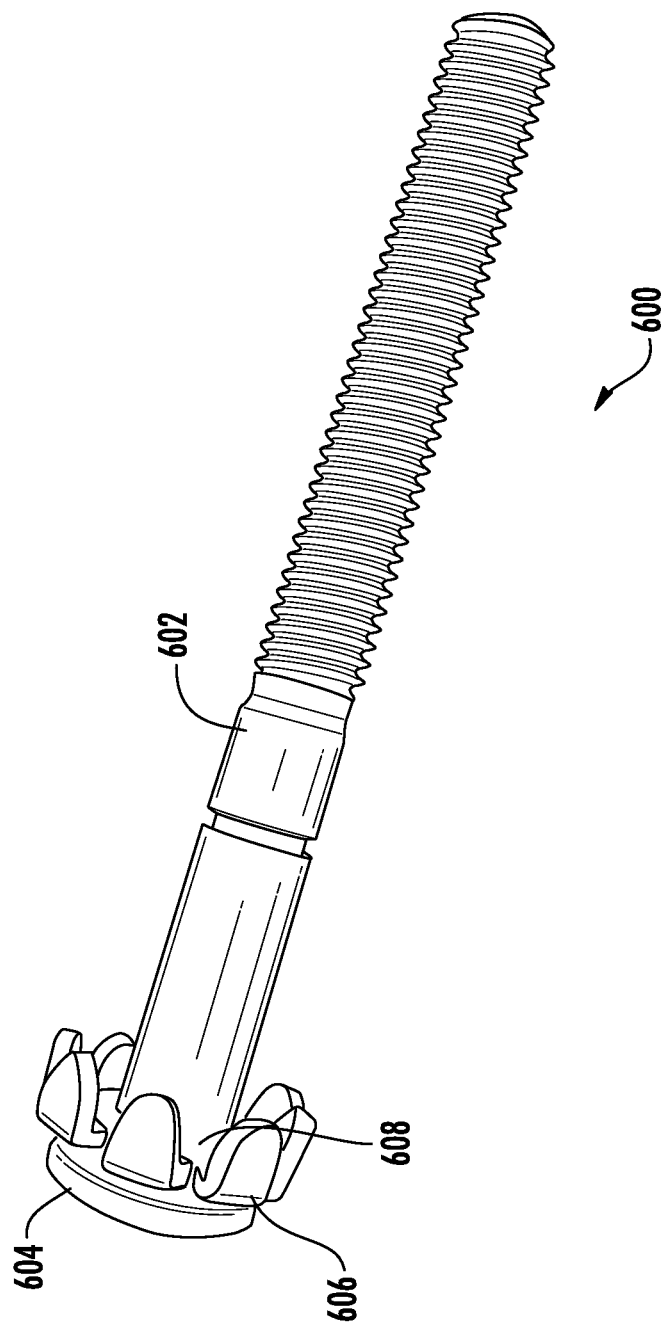
FIG. 6 shows an example of a threaded post that can be used with an adjustment mechanism.

FIG. 6 shows an example of a threaded post 600 that can be used with an adjustment mechanism. For example, the threaded post 600 can serve as a moveable member in any or all examples described herein. Here, the threaded post 600 includes a body 602, a head 604, and a set of teeth 606. The threaded post 600 can include any suitable number of teeth 606 depending on the particular implementation. In some implementations, the teeth 606 are provided in form of a toothed washer on the threaded post 600. The toothed washer can be secured to the threaded post 600 in any suitable way. For example, one or more welds 608 (e.g., a spot weld) can be used for attachment. The pitch of the threaded post 600 can be selected to provide a particular adjustment resolution of an adjustable bracket 100, to make the adjustment more or less sensitive to the actuator tool. For example, a greater or smaller amount of rotation of the actuating tool may be required depending on the adjustment resolution.

Figure 7:
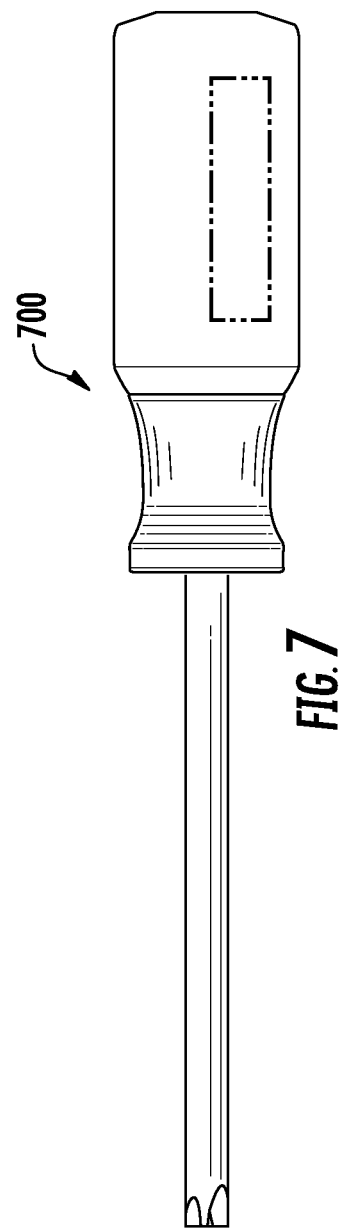
FIGS. 7 and 7A show an example of a toothed actuator that can be used with an adjustment mechanism.
Figure 7A:
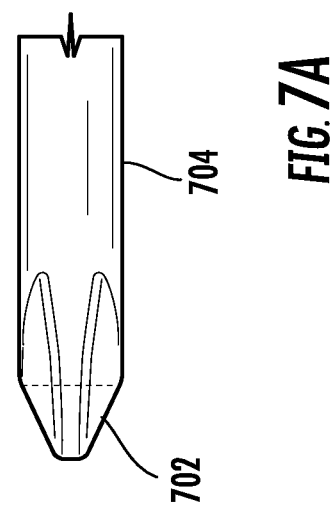

FIGS. 7 and 7A show an example of a toothed actuator 700 that can be used with an adjustment mechanism. The toothed actuator 700 can have any form of teeth around its periphery, at least near the tip. Here, the toothed actuator 700 includes a Phillips screwdriver on which the tip has been removed. For example, the tip can be ground down by a desired amount. The size of the screwdriver can be selected based on the teeth of the particular moveable members, and also based on the size of the passage where the tool should be inserted. FIG. 7A schematically shows that a portion 702 of the tip can be removed from a remainder 704 of the tool. This can render the actuator suitable for use with any or all adjustment mechanisms described herein. For example, the actuator tool and a single adjustable bracket can be considered a kit where the bracket is to be installed and the tool used for adjustment. As another example, the same tool can be used for the adjustment of multiple or several installed brackets, such as in an assembly facility. Accordingly, the actuator tool can be considered as being paired with one or more of the adjustment brackets.

With reference again briefly to FIG. 4, the toothed actuator 700 is insertable into the passage 120C so that the teeth of the actuator will mesh with the teeth 304 of the post 104A. For example, the (ground-down) tip of the tool can then rest against the body of the post, or the plane 510 (FIG. 5), or both. The toothed actuator is also similarly insertable into the passage 120D so that the teeth of the actuator will mesh with the teeth 304 of the post 104B. In some implementations, the engagement with the post 104B requires the tool to be inserted further into the bracket (i.e., in that respective passage thereof) than does the engagement with the post 104A. As such, the tool should have sufficient length to facilitate either of these operations.

Figure 8:
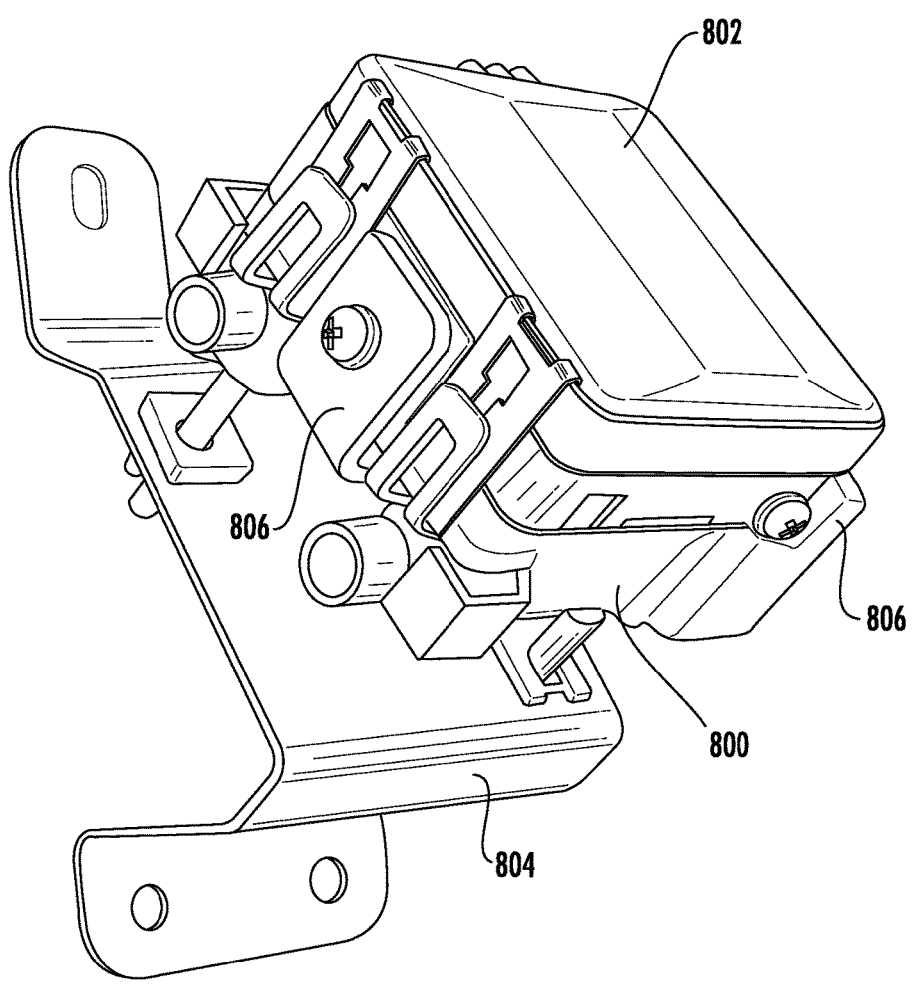
FIG. 8 shows an example of an adjustable bracket having an emitter/detector device mounted thereon.

FIG. 8 shows an example of an adjustable bracket 800 having an emitter/detector device 802 thereon. In some implementations, the device includes a radar that is configured for emitting and detecting radar signals, such as for use in determining positions and/or velocity of objects. The bracket is here mounted on an element 804. For example, this allows the device 802 to be adjusted in one or more directions (e.g., horizontally and/or vertically) with regard to the supporting structure. The device 802 can be attached on an attachment plane defined by the bracket. For example, one or more attachments 806 can be used.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An adjustable bracket comprising:
    a body of quadrilateral shape that defines an attachment plane for a device, the body comprising:
        a first adjustment mechanism located adjacent a first corner of the quadrilateral shape, the first adjustment mechanism comprising a first passage transverse to the attachment plane, a second passage parallel to the attachment plane and leading to the first passage, and a first moveable member extending in the first passage;
        a second adjustment mechanism located adjacent a second corner of the quadrilateral shape, the second adjustment mechanism comprising a third passage transverse to the attachment plane, a fourth passage parallel to the attachment plane and leading from a third corner of the quadrilateral shape to the third passage, and a second moveable member extending in the third passage; and
        a pivot located adjacent a fourth corner of the quadrilateral shape, wherein each of the first and second adjustment mechanisms is configured for adjusting the adjustable bracket relative to the pivot.

2. The adjustable bracket of claim 1, wherein the second passage and the fourth passage are parallel to each other.

3. The adjustable bracket of claim 2, wherein the adjustable bracket is configured to be installed so that openings of the parallel second and fourth passages face upward.

4. The adjustable bracket of claim 1, wherein the first passage and the third passage each extends through an entire thickness of the body.

5. The adjustable bracket of claim 1, wherein the first and second moveable members comprise respective first and second threaded posts each configured to engage in a threaded fit with a respective one of first and second fasteners, wherein rotation of the first or second threaded post relative to the respective first or second fastener causes adjustment of the adjustable bracket.

6. The adjustable bracket of claim 5, wherein the first and second fasteners comprises respective first and second grommets.

7. The adjustable bracket of claim 6, wherein the pivot comprises a third threaded post configured to engage in a threaded fit with a third grommet.

8. The adjustable bracket of claim 7, wherein the third grommet provides pivoting ability to the adjustable bracket.

9. The adjustable bracket of claim 5, wherein the first threaded post has first teeth adjacent the second passage, wherein the second threaded post has second teeth adjacent the fourth passage, and whether the first and second teeth are configured for rotational advancement and retraction of the first and second threaded posts, respectively.

10. The adjustable bracket of claim 9, wherein each of the first and second threaded posts comprises a bolt, a toothed washer adjacent a head of the bolt, and a weld securing the toothed washer to the bolt.

11. The adjustable bracket of claim 9, wherein the first passage is at least partly defined by a first partially open cylinder, the first partially open cylinder having a first opening facing the second passage, and wherein the third passage is at least partly defined by a second partially open cylinder, the second partially open cylinder having a second opening facing the fourth passage.

12. The adjustable bracket of claim 9, wherein the first teeth are oriented parallel to the first threaded post and are positioned around an outside of the first partially open cylinder, and wherein the second teeth are oriented parallel to the second threaded post and are positioned around an outside of the second partially open cylinder.

13. The adjustable bracket of claim 9, wherein a pitch of the first and second threaded posts is selected to provide a particular adjustment resolution of the adjustable bracket.

14. The adjustable bracket of claim 1, wherein the adjustable bracket comprises first and second transverse members that are parallel and connected to each other at respective ends to form the attachment plane.

15. The adjustable bracket of claim 14, wherein the first and second passages are located in the first transverse member, wherein the third passage is located in the second transverse member, and wherein the fourth passage extends between the first and second transverse members.

16. The adjustable bracket of claim 1, wherein the first adjustment mechanism is configured for adjusting the adjustable bracket in a first direction, and wherein the second adjustment mechanism is configured for adjusting the adjustable bracket in a second direction transverse to the first direction.

17. The adjustable bracket of claim 16, wherein the first adjustment mechanism is configured for vertical adjustment, and wherein the second adjustment mechanism is configured for horizontal adjustment.

18. A kit comprising:
an adjustable bracket comprising:
a first adjustment mechanism comprising a first transverse passage, a second passage perpendicular to, and leading to, the first transverse passage, and a first threaded bolt extending in the first transverse passage, the first transverse passage at least in part defined by a first partially open cylinder having a first opening facing the second passage, wherein the first threaded bolt has first teeth positioned around an outside of the first partially open cylinder;
a second adjustment mechanism comprising a third transverse passage, a fourth passage perpendicular to, and leading to, the third transverse passage, and a second threaded bolt extending in the third transverse passage, the third transverse passage at least in part defined by a second partially open cylinder having a second opening facing the fourth passage, wherein the second threaded bolt has second teeth positioned around an outside of the second partially open cylinder; and
a pivot, wherein each of the first and second adjustment mechanisms is configured for adjusting the adjustable bracket relative to the pivot; and
a toothed actuator having a tip with third teeth thereon, the toothed actuator insertable into the second passage so that the third teeth mesh with the first teeth of the first threaded bolt, the toothed actuator also insertable into the fourth passage so that the third teeth mesh with the second teeth of the second threaded bolt.

19. The kit of claim 18, wherein the adjustable bracket is of quadrilateral shape and defines an attachment plane, wherein the first adjustment mechanism is located adjacent a first corner, and the second adjustment mechanism is located adjacent a second corner, of the quadrilateral shape.

20. The kit of claim 19, wherein the adjustable bracket comprises first and second transverse members that are parallel and connected to each other at respective ends to form the attachment plane.

21. The kit of claim 20, wherein the first transverse passage is in the first transverse member, and wherein the third transverse passage extends between the first and second transverse members.

22. The kit of claim 18, wherein the toothed actuator comprises a screwdriver on which a part of the tip has been removed to facilitate meshing between the third teeth and the respective first and second teeth.

* * * * *